(12) United States Patent
Huang et al.

(10) Patent No.: US 8,064,015 B2
(45) Date of Patent: Nov. 22, 2011

(54) TRANSFLECTIVE DISPLAY PANEL

(75) Inventors: Jung-Yen Huang, Hsin-Chu (TW);
Chin-Yu Chang, Hsin-Chu (TW);
Shih-Feng Hsu, Hsin-Chu (TW);
Wei-Pang Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 192 days.

(21) Appl. No.: 12/684,119

(22) Filed: Jan. 8, 2010

(65) Prior Publication Data
US 2010/0171905 A1 Jul. 8, 2010

(30) Foreign Application Priority Data
Jan. 8, 2009 (TW) ................................ 98100466 A

(51) Int. Cl.
*G02F 1/1333* (2006.01)

(52) U.S. Cl. ........................................ 349/114; 349/43

(58) Field of Classification Search .................. 349/114
See application file for complete search history.

(56) References Cited

U.S. PATENT DOCUMENTS

| 7,821,587 B2 * | 10/2010 | Hosoya | 349/43 |
| 7,944,536 B2 * | 5/2011 | Otake | 349/138 |
| 2003/0052869 A1 | 3/2003 | Fujii | |
| 2006/0244880 A1 * | 11/2006 | Onishi et al. | 349/74 |
| 2007/0057881 A1 | 3/2007 | Yu | |

FOREIGN PATENT DOCUMENTS

| JP | 2002196702 | 7/2002 |
| JP | 2003076302 | 3/2003 |
| JP | 2006178335 | 7/2006 |
| TW | I292283 | 1/2008 |

* cited by examiner

*Primary Examiner* — Phu Vu
(74) *Attorney, Agent, or Firm* — Winston Hsu; Scott Margo

(57) ABSTRACT

A transflective display panel includes a first substrate, a plurality of electroluminescent (EL) elements disposed on the first substrate, a plurality of reflectors disposed on the first substrate, a second substrate disposed opposite to the first substrate, a plurality of transparent electrodes disposed on a side of the second substrate opposite to the first substrate, a plurality of color filter layers disposed on a side of the second substrate opposite to the first substrate, and a liquid crystal layer disposed between the first substrate and the second substrate. Accordingly, a problem of insufficient contrast ratio of the transflective display panel can be solved, when the ambient light is too high.

17 Claims, 5 Drawing Sheets

TRANSFLECTIVE DISPLAY PANEL

BACKGROUND OF THE INVENTION

1. Field of the Invention

The present invention relates to a transflective display panel, and more particularly, to a display panel having an electroluminescent display panel and a transflective liquid crystal display panel.

2. Description of the Prior Art

Recently, electroluminescent (EL) display panels, such as organic electroluminescent display panels, have become popular flat displays, because of having the advantages of self-luminescence, wide viewing angle, fast response time, high illumination efficiency, low operating voltage, thin panel thickness, flexibility and a simple fabricating process. These EL display panels have been widely applied to all kinds of flat display products.

Please refer to FIG. 1, which is a cross-sectional schematic diagram illustrating an EL display panel according to the prior art. As shown in FIG. 1, the EL display panel 10 includes a TFT (thin-film transistor) substrate 12, an anode 14, an organic light-emitting layer 16, a cathode 18 and a transparent substrate 20. The TFT substrate 12 includes a substrate 22, a TFT 24 disposed on the substrate 22, and a passivation layer 26 covering the TFT 24 and the substrate 22. The anode 14 covers the passivation layer 26, and is electrically connected to a drain of the TFT 24 through a contact hole 28. In addition, the organic light-emitting layer 16 is disposed on the anode 14, and the cathode 18 is disposed on the organic light-emitting layer 16. The transparent substrate 20 covers the cathode 18.

The brightness of the EL display panel of the prior art is determined by the luminance of the organic light-emitting layer. When the brightness of the ambient light is larger, the ratio of the brightness of the organic light-emitting layer to that of the ambient light is reduced, so that the contrast ratio of the image displayed by the EL display panel of the prior art is reduced. In a worst case, the image displayed by the EL display panel of the prior art cannot be shown. In the organic EL display panel of the prior art, increasing the reduced contrast ratio should raise the luminance of the organic light-emitting layer so as to prevent the image displayed by the EL display from being affected by the ambient light with over-high brightness. However, raising the luminance of the organic light-emitting layer not only consumes more power, but also shortens the lifetime of the organic light-emitting layer. Therefore, to increase the contrast ratio of the EL display panel is an important subject when the brightness of the ambient light is too high.

SUMMARY OF THE INVENTION

It is therefore an objective to provide a transflective display panel so as to solve the problem of insufficient contrast ratio of the electroluminescent (EL) display under the over-high ambient light.

According to an embodiment of the present invention, a transflective display panel is provided. The transflective display panel has a plurality of pixel regions defined thereon, and each pixel region includes a reflective region and a transmissive region. The transflective display panel includes a first substrate, a plurality of driving elements disposed on the first substrate, a plurality of EL elements disposed on the first substrate, a plurality of reflectors disposed on the first substrate, a second substrate disposed opposite to the first substrate, a plurality of first switching elements disposed on a side of the second substrate opposite to the first substrate, a plurality of transparent electrode disposed on a side of the second substrate opposite to the first substrate, a plurality of color filter layers disposed on a side of the second substrate opposite to the first substrate, and a liquid crystal layer disposed between the first substrate and the second substrate. Each driving element is respectively disposed in each pixel region. Each EL element is respectively disposed in each transmissive region, and in a pixel region, the EL element and the driving element are electrically connected to each other. Each reflector is disposed in each reflective region, and each first switching element is respectively disposed in each pixel region. In a pixel region, each transparent electrode is respectively disposed in the transmissive region, and each transparent electrode is extended to the reflective region and electrically connected to the first switching element. Each color filter layer is respectively disposed in each pixel region.

The present invention forms an EL panel on the first substrate in the transmissive region, and disposes bumps and reflectors on the first substrate in the reflective region and the color filter layer on the second substrate in the pixel region so as to form a transflective liquid crystal display panel on the EL panel. Therefore, the present invention not only provides the EL panel for displaying an image, but also provides the transflective liquid crystal panel that uses the ambient light to increase the brightness of the transflective display panel, so that the problem of insufficient contrast ratio of the EL display panel can be effectively solved when the brightness of the ambient light is over-high.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
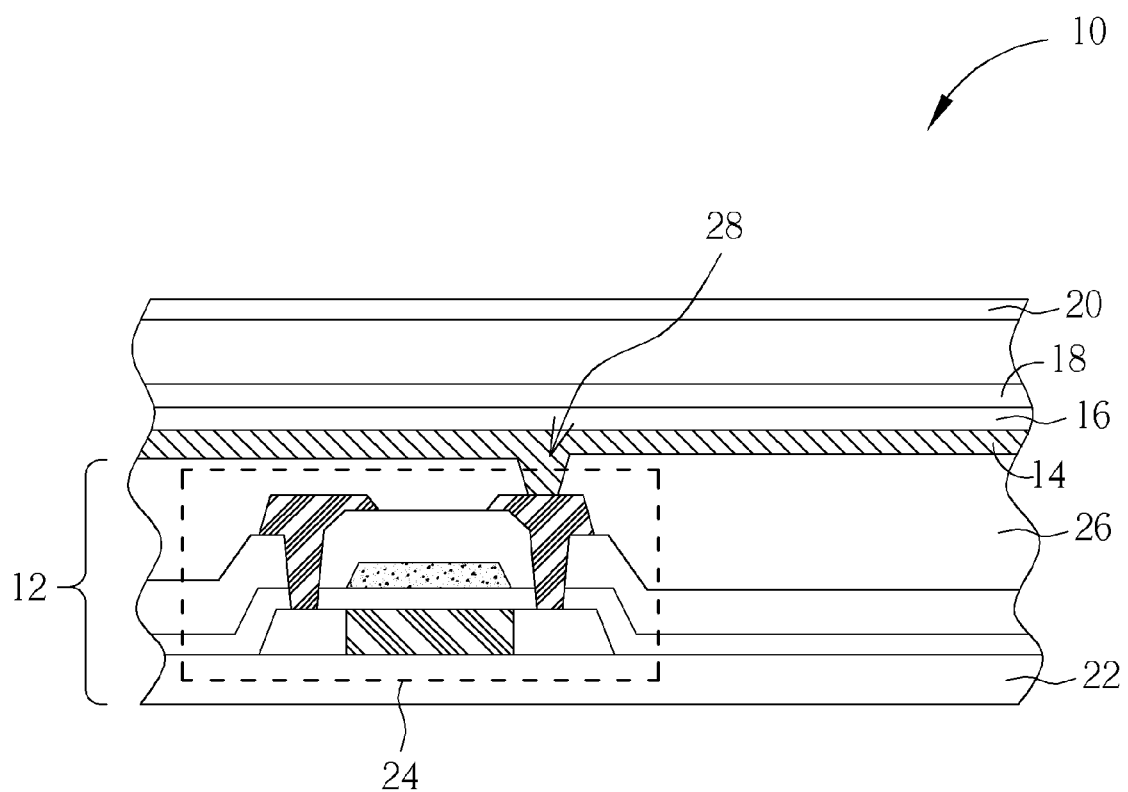
FIG. 1 is a cross-sectional schematic diagram illustrating an EL display panel according to the prior art.
Figure 2:
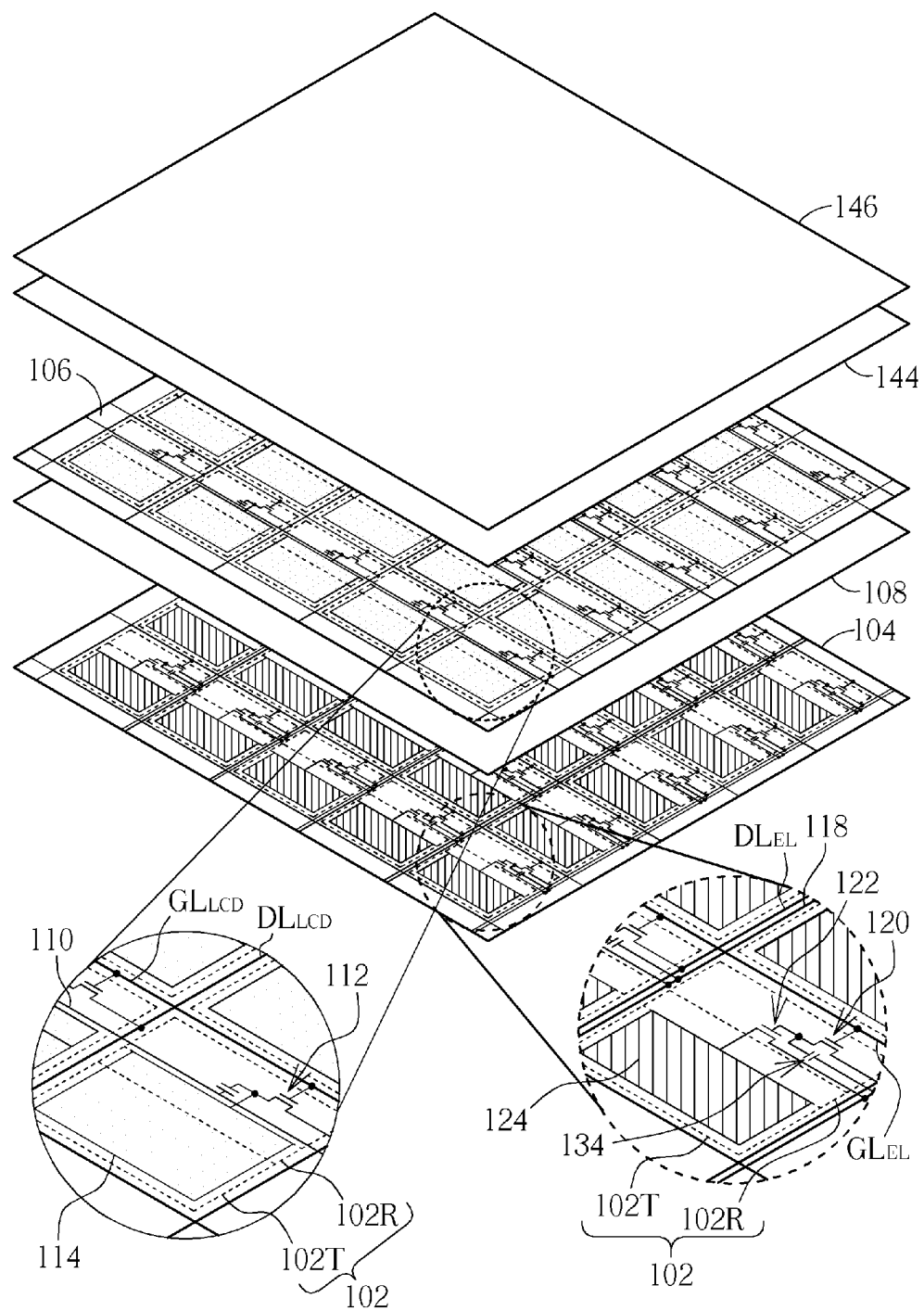
FIG. 2 is an exploded schematic diagram illustrating a transflective display panel of a first preferred embodiment of the present invention.
Figure 3:
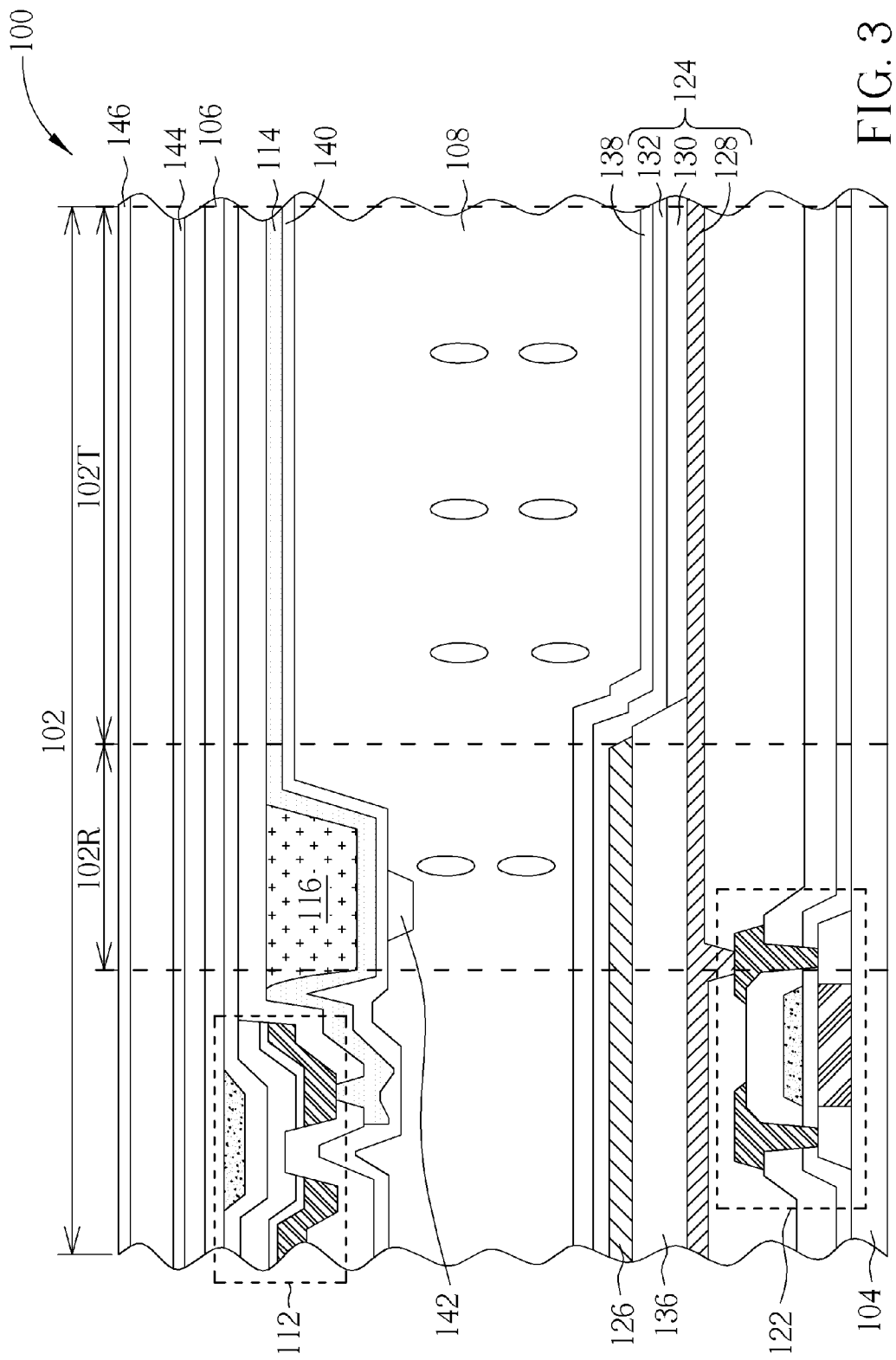
FIG. 3 is a cross-sectional schematic diagram illustrating the transflective display panel of the first preferred embodiment of the present invention.

Please refer to FIG. 2 and FIG. 3. FIG. 2 is an exploded schematic diagram illustrating a transflective display panel of a first preferred embodiment of the present invention. FIG. 3 is a cross-sectional schematic diagram illustrating the transflective display panel of the first preferred embodiment of the present invention. As shown in FIG. 2 and FIG. 3, the transflective display panel 100 has a plurality of pixel regions 102 defined thereon, and each pixel region 102 includes a reflective region 102R and a transmissive region 102T. The transflective display panel 100 of this embodiment includes a first substrate 104, a second substrate 106 and a liquid crystal layer 108. The second substrate 106 is disposed opposite to the first substrate 104, and the liquid crystal layer 108 is disposed between the first substrate 104 and the second substrate 106. The first substrate 104 is a substrate for fabricating all kinds of TFTs formed thereon, such as silicon substrate, glass substrate or plastic substrate etc. The second substrate 106 is a transparent substrate for fabricating all kinds of TFTs, such as glass substrate or plastic substrate etc.

In this embodiment, a plurality of gate lines $GL_{LCD}$, a plurality of data lines $DL_{LCD}$, a plurality of common lines 110, a plurality of first switching elements 112, a plurality of transparent electrodes 114, and a plurality of color filter layers 116 are disposed between the second substrate 106 and the liquid crystal layer 108. The gate lines $GL_{LCD}$ and the data lines $DL_{LCD}$ are disposed on a side of the second substrate opposite to the first substrate, and each gate line $GL_{LCD}$ and each data line $DL_{LCD}$ are substantially perpendicular to each other. The gate lines $GL_{LCD}$ and the data lines $DL_{LCD}$ correspond to a border between the adjacent pixel regions 102. The common lines 110 are disposed on a side of the second substrate 106 opposite to the first substrate 104 and substantially parallel to the gate lines $GL_{LCD}$, and the common lines 110 are electrically connected to a common voltage. Each first switching element 112 is respectively disposed on a side of the second substrate in each pixel region 112 opposite to the first substrate 104, and a gate of the first switching element 112 is electrically connected to the corresponding gate line $GL_{LCD}$. A source of the first switching element 112 is electrically connected to the corresponding data line $DL_{LCD}$. Each transparent electrode 114 is respectively disposed in the transmissive region 102T and extended to be disposed on the second substrate 106 in the reflective region 102R. In each pixel region 102, the transparent electrode 114 is electrically connected to a drain of the first switching element 112. Each color filter layer 116 is respectively disposed on a side of the second substrate in the reflective region 102R of each pixel region 102 opposite to the first substrate 104, and in each pixel region 102, the color filter layer 116 includes a first color filter layer, a second color filter layer and a third color filter layer. The first color filter layer can be a red color filter. The second color filter layer can be a green color filter, and the third color filter layer can be a blue color filter. The present invention is not limited to this, and the first color filter layer, the second color filter layer and the third color filter layer may be exchanged with each other.

In this embodiment, a plurality of gate lines $GL_{EL}$, a plurality of data lines $DL_{EL}$, a plurality of power lines 118, a plurality of second switching elements 120, a plurality of driving elements 122, a plurality of electroluminescent (EL) elements 124 and a plurality of reflectors 126 are disposed between the first substrate 104 and the liquid crystal layer 108. The gate lines $GL_{EL}$ and the data lines $DL_{EL}$ are disposed on the first substrate 104, and each gate line $GL_{EL}$ and each data line $DL_{EL}$ are substantially perpendicular to each other.

The gate lines $GL_{EL}$ and the data lines $DL_{EL}$ correspond to the border between the adjacent pixel regions 102. The power lines 118 are disposed on the first substrate 104 and substantially parallel to the data lines $DL_{EL}$. The power lines 118 correspond to the border between the adjacent pixel regions 102 and are used for driving the EL elements 124. Furthermore, the power lines 118 can be electrically connected to the common lines 110, and the design of the transflective display panel 100 can thereby be simpler. Each second switching element 120 is respectively disposed on the first substrate 104 in each pixel region 102, and in the same pixel region 102, a gate of the second switching element 120 is electrically connected to the corresponding gate line $GL_{EL}$. A source of the second switching element 120 is electrically connected to the corresponding data line $DL_{EL}$ so that the second switching element 120 controls whether the signal is inputted to the data line $DL_{EL}$. Each driving element 122 is respectively disposed on the first substrate 104 in each pixel region 102, and a gate of the driving element 122 is electrically connected to a drain of the corresponding second switching element 120. A source of the driving element 122 is electrically connected to the corresponding power line 118. In this embodiment, each second switching element 120 and each driving element 122 are disposed in each pixel region 102 outside the reflective region 102R and the transmissive region 102T. For example, the second switching element 120 and the driving element 122 are disposed in the circuit region, but the embodiment is not limited thereto. Each second switching element 120 and each driving element 122 can also be disposed between the EL element 124 and the first substrate 104 in the reflective region 102R or in the transmissive region 102T. In addition, each EL element 124 is disposed on the first substrate 104 in the transmissive region 102T of each pixel region 102, and each EL element 124 includes an anode 128, a light-emitting layer 130 and a cathode 132 sequentially disposed on the first substrate 104 in the transmissive region 102T. The anode 128 is electrically connected to a drain of the driving element 122 in each pixel region 102. However, according to the designed requirements, the positions of the anode 128 and the cathode 132 can be exchanged, but the embodiment is not limited thereto. It should be noted that the cathode 132 of this embodiment is electrically connected to the corresponding common line 110, so that a voltage difference between the transparent electrode 114 and the cathode 132 can control rotation of liquid crystal molecules in the liquid crystal layer 108 between the transparent electrode 114 and the cathode 132. In addition, in each pixel region 102, a storage capacitor 134 can be formed between the drain of the second switching element 120 and the power line 118 or between the gate of the driving element 122 and the power line 118 so as to store the signal from the corresponding data line $DL_{EL}$. According to the above-mentioned electrical connection, the second switching element 120 can control whether the signal from the data line $DL_{EL}$ is inputted into the storage capacitor or not, and the driving element 122 can control whether the power line 118 inputs current into the corresponding EL element 124 or not. The EL element 124 can be driven when the second switching element 120 and the driving element 122 are turned on. In addition, the storage capacitor 134 can effectively reduce the switching rate of the driving element 122, so that the current provided from the power line 118 has enough time to drive the EL element 124. The EL elements 124 can include a plurality of first EL elements, a plurality of second EL elements and a plurality of third EL elements. Each first EL element, each second EL element and each third EL element can be, respectively, a light-emitting element of a single color, such as a red light-emitting element, green light-emitting element and blue light-emitting element. Each first EL element, each second EL element and each third EL element can generate white light, so that the transflective display panel 100 can display full color images. It should be noted that color of the light from each EL element 124 in the transmissive region 102T should be substantially the same as the color of the color filter layer 116 in each pixel region 102 so as to have the same color of the light displayed in each pixel. The light-emitting layers 130 can be composed of organic EL materials, and the EL elements 124 corresponding to different colors respectively use materials generating different colors. The anodes 128 are composed of material with high reflectivity, such as aluminum, silver, gold, nickel, platinum or a combination thereof, so that the light generated from the light-emitting layer 130 can be reflected outward. The cathodes 132 are composed of material with high transparency, such as metal thin film of a thin thickness, so that the light generated from the light-emitting layer 130 can pass through the cathode 132 and be emitted outwards.

Figure 4:
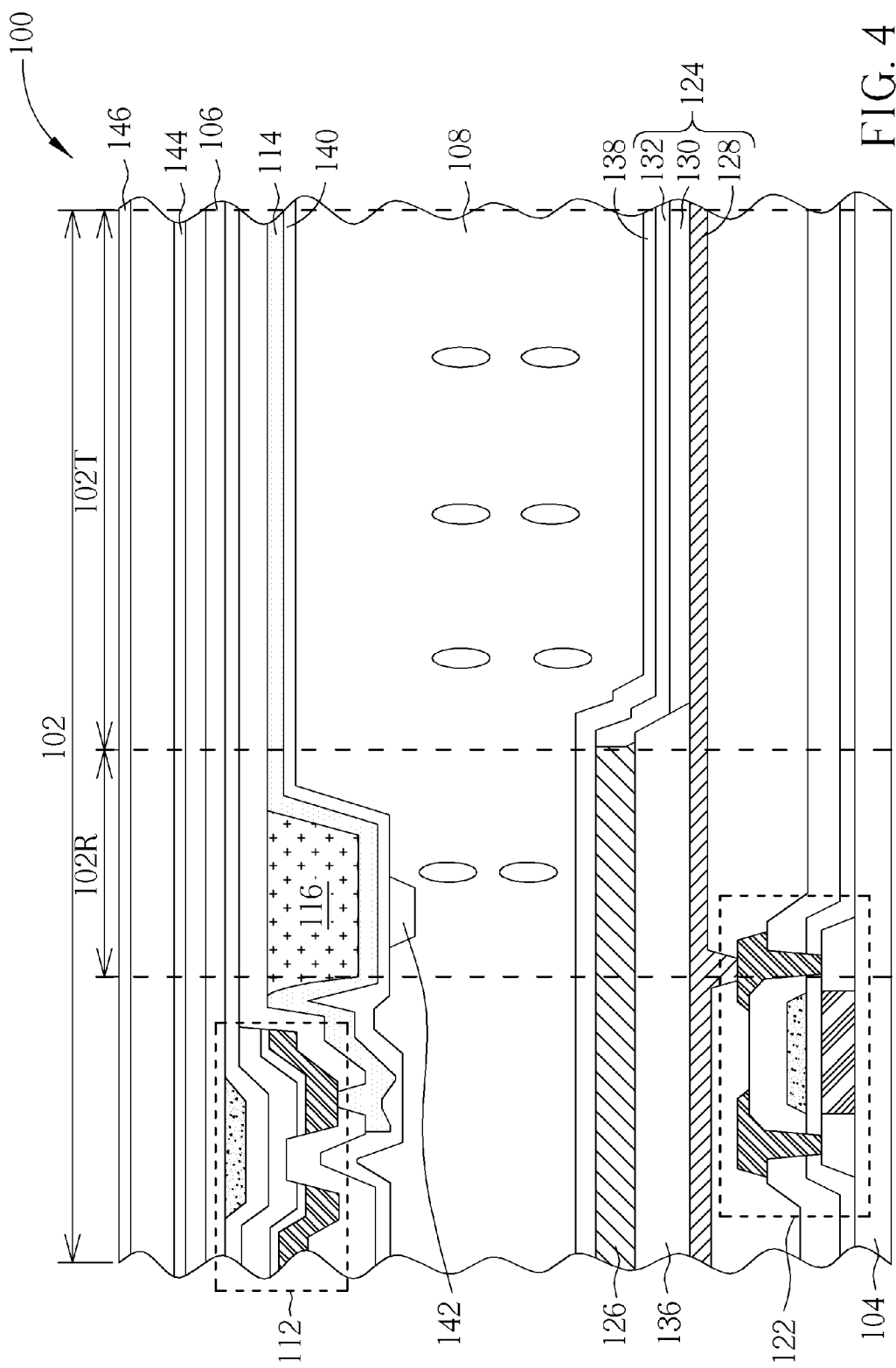
FIG. 4 is a cross-sectional schematic diagram illustrating another example of the transflective display panel according to the first preferred embodiment.

Furthermore, each reflector 126 is respectively disposed on the first substrate 104 in each reflective region 102R. The reflectors 126 are composed of material with high reflectivity, such as thin-film metal, and can be used to reflect the ambient light that is emitted to the transflective display panel 100. In this embodiment, the cathode 132 of each EL element 124 is extended to the reflective region 102R and covers the reflector 126, but the present invention is not limited to this. Please refer to FIG. 4, which is a cross-sectional schematic diagram illustrating another example of the transflective display panel according to the first preferred embodiment. As shown in FIG. 4, the cathode 132 of each EL element 124 is not extended to the reflective region 102R, and is only electrically connected to the reflector 126. In this example, the reflectors 126 are composed of conductive material, and each reflector 126 is used as an electrode for controlling the liquid crystal layer 108 in the reflective region 102R.

Please refer to FIG. 3 again. The transflective display panel 100 further includes a plurality of bumps 136 disposed on the first substrate 104 and respectively disposed in each reflective region 102R. The bumps 136 can be composed of organic material, and each bump 136 has a rough surface (not shown). Accordingly, each reflector 126 also has a rough surface (not shown) so as to uniformly scatter the ambient light. The size of the cell gap of the liquid crystal layer 108 in the reflective region 102R can be controlled by adjusting the thickness of the bumps 136.

In addition, the transflective display panel 100 of this embodiment further includes two alignment layers 138, 140 respectively disposed between the liquid crystal layer 108 and the first substrate 104 and between the liquid crystal layer 108 and the second substrate 106, and the alignments 138, 140 are used to align the liquid crystal molecules of the liquid crystal layer 108. The transflective display panel 100 further includes a plurality of protrusions 142 respectively disposed in each reflective region 102R. Each protrusion 142 is disposed between each transparent electrode 114 and the liquid crystal layer 108 and disposed on a side of the alignment layer 140 opposite to the liquid crystal layer 108. The transflective display panel 100 further includes a quarter-wave plate 144 and a polarizer 146. The quarter-wave plate 144 is disposed on the other side of the second substrate 106 opposite to the first substrate 104, and the polarizer 146 is disposed on the quarter-wave plate 144.

As shown by the above-mentioned description, this embodiment disposes the gate line $GL_{EL}$, the data line $DL_{EL}$, the power line 118, the second switching element 120 and the driving element 122 on the first substrate 104 in the pixel region 102, and disposes the EL element 124 in the transmissive region 102T of the pixel region 102 so as to form an EL panel in the transmissive region 102T. Furthermore, this embodiment disposes the gate line $GL_{LCD}$, the data line $DL_{LCD}$, the common line 110, the first switching element 112 and the transparent electrode 114 on a side of the second substrate 106 in the pixel region 102 opposite to the first substrate 104, and electrically connects the common line 110 and the cathode 132 of the EL element 124, so that the liquid crystal layer 108 between the first substrate 104 and the second substrate 106 can be driven to rotate. Moreover, each bump 136 and each reflector 126 are disposed on the first substrate 104 in the reflective region 102R, and the color filter layer 116 is disposed on the second substrate 106 in the reflective region 102R, so that a transflective liquid crystal display panel can be formed on the EL panel. Therefore, this embodiment not only can display images through the EL panel, but also uses the ambient light to increase the brightness of the transflective display panel 100 through the transflective liquid crystal display panel, so that insufficient contrast ratio of the EL display panel of the prior art can be effectively improved when the brightness of the ambient light is too high.

The following description will describe the operation of the transflective display panel 100 of this embodiment. When the transflective display panel 100 is in a bright state, which means the transflective display panel 100 is displaying a bright image, the EL element 124 in the transmissive region 102T of each pixel region 102 is driven to generate the unpolarized light. The unpolarized light can sequentially pass through the liquid crystal layer 108, quarter-wave plate 144 and the polarizer 146, and the bright image can be shown in the transmissive region 102T to the observer. At the same time, in the reflective region 102R, a voltage difference is provided between the transparent electrode 114 and the cathode 132 of the EL element 124 to rotate the liquid crystal molecules of the liquid crystal layer 108; meanwhile, the liquid crystal layer 108 has a characteristic of retarding the light a quarter of a wavelength. After the ambient light emitted to the reflective region 102R sequentially passes through the polarizer 146, the quarter-wave plate 144 and the liquid crystal layer 108, the ambient light is linearly polarized. Next, the light with linear polarization is reflected by the reflector 126, and then, sequentially passes through the liquid crystal layer 108, the quarter-wave plate 144 and the polarizer 146, so that the bright image can be shown to the observer. In the bright state, even if the brightness of the ambient light is too high, the liquid crystal display panel of this embodiment in the reflective region 102R can use the ambient light to compensate the brightness of the transflective display panel 100 when displaying the bright image, so that the contrast ratio of the transflective display panel 100 may not be affected by the ambient light or the variance or reduction of the contrast ratio may be reduced as well. Furthermore, when the transflective display panel 100 is in a dark state, which means the transflective display panel 100 is displaying a dark image, the EL element 124 is not driven, and no light is generated. There is no voltage difference provided between the transparent electrode 114 and the cathode 132 of the EL element 124, so that the liquid crystal layer 108 is not rotated, and does not have the characteristic of retardation of light. Meanwhile, in the transmissive region 102T and the reflective region 102R, the ambient light passes through the polarizer 146 and the quarter-wave plate 144, and is transformed to have right-rotated/left-rotated polarization. Then, after being reflected by the reflector 126, the light with right-rotated/left-rotated polarization is transformed to be the light with left-rotated/right-rotated polarization. Therefore, after passing through the quarter-wave plate 144, the light cannot pass through the polarizer 146, and a dark state is generated. For this reason, the transflective display panel 100 can also provide a good dark image to the observer so as to have a good contrast ratio under strong ambient light.

Figure 5:
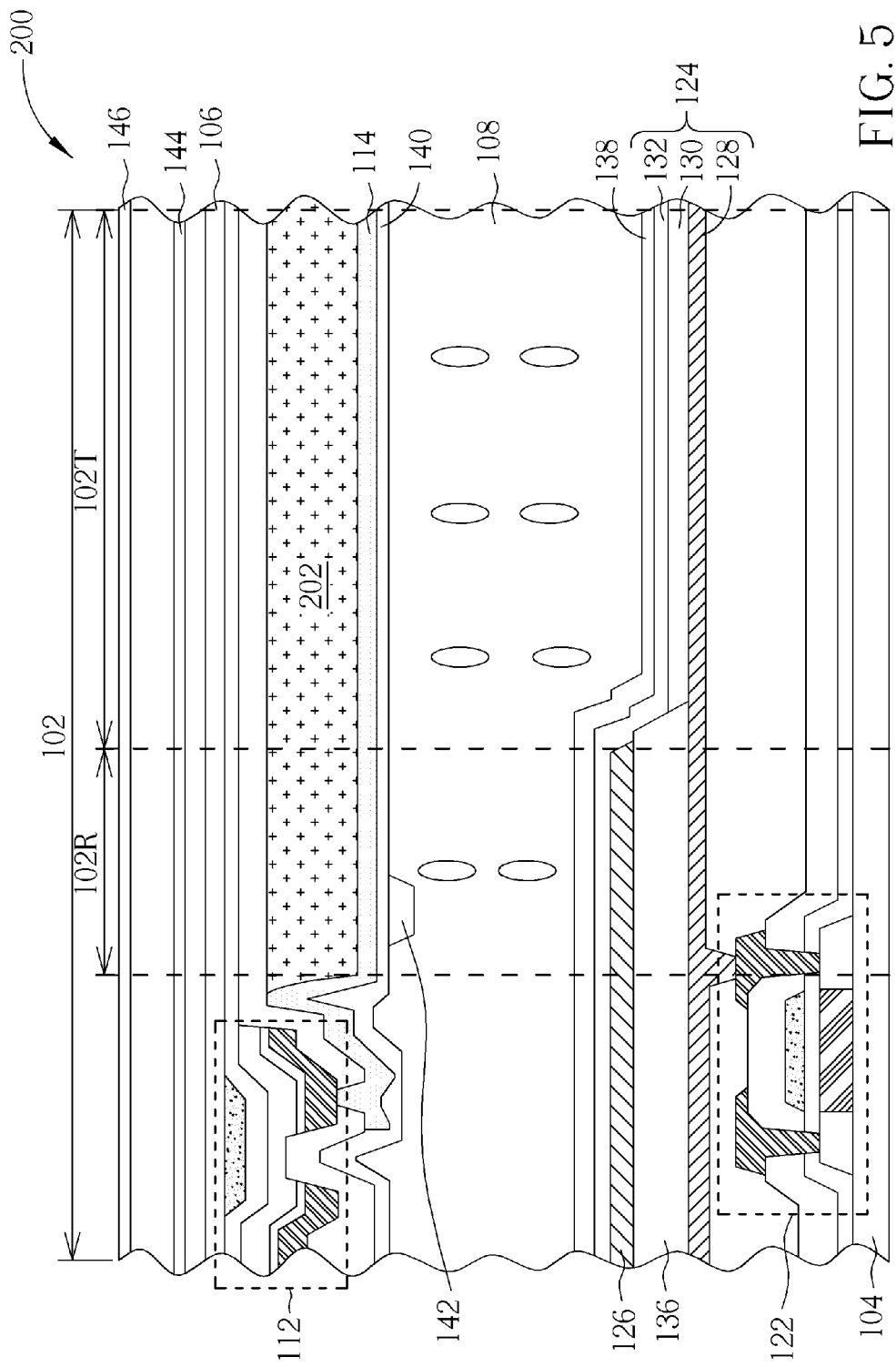
FIG. 5 is a cross-sectional schematic diagram illustrating a transflective display panel according to a second preferred embodiment of the present invention.

In addition, the color filter layer of the transflective display panel of the present invention is not limited to be disposed in the reflective region, and the color filter layer of the present invention also can be disposed both in the reflective region and the transmissive region. Please refer to FIG. 5, which is a cross-sectional schematic diagram illustrating a transflective display panel according to a second preferred embodiment of the present invention. In order to simplify the description and clearly compare the difference between the embodiments of the present invention, devices of the second preferred embodiment which are the same as the first preferred embodiment use the same labels in the following description, and the same devices will therefore not be detailed again. As shown in FIG. 5, as compared with the first preferred embodiment, each color filter layer 202 of the transflective display panel 200 of this embodiment is respectively disposed in each reflective region 102R and each transmissive region 102T. In each pixel region 102, the color filter layer 202 disposed in the transmissive region 102T can purify the color of the light emitted from the EL element 124, so that the color displayed in a same pixel can be uniform. The light-emitting layer 130 can be a red light-emitting layer, green light-emitting layer, blue light-emitting layer or the combinations thereof. Furthermore, in this embodiment, as well as the EL element 124 being an emitting element generating single color, the EL element 124 can also be an emitting element generating white light. For example, the light-emitting layer 130 can be a multilayer light-emitting layer formed by a stack of a red light-emitting layer, green light-emitting layer and blue light-emitting layer.

In summary, the present invention forms an EL panel on the first substrate in the transmissive region, disposes bumps and reflectors on the first substrate in the reflective region and the color filter layer on the second substrate in the pixel region, and electrically connects the common line and the cathode of the EL element so as to form a transflective liquid crystal display panel on the EL panel. Therefore, the present invention not only provides the EL panel for displaying image, but also provides the transflective liquid crystal panel that uses ambient light to increase the brightness of the transflective display panel, so that the problem of insufficient contrast ratio of the EL display panel can be effectively solved when the brightness of the ambient light is too high.

Those skilled in the art will readily observe that numerous modifications and alterations of the device and method may be made while retaining the teachings of the invention.

What is claimed is:

1. A transflective display panel, having a plurality of pixel regions, each pixel region comprising a reflective region and a transmissive region, the transflective display panel comprising:
    a first substrate;
    a plurality of driving elements, disposed on the first substrate, and each driving element being respectively disposed in each pixel region;
    a plurality of electroluminescent (EL) elements, disposed on the first substrate, each EL element being respectively disposed in each transmissive region, and the EL element and the driving element being electrically connected to each other in a pixel region;
    a plurality of reflectors, disposed on the first substrate, each reflector being respectively disposed in each reflective region;
    a second substrate, disposed opposite to the first substrate;
    a plurality of first switching elements, disposed on a side of the second substrate opposite to the first substrate, each first switching element being respectively disposed in each pixel region;
    a plurality of transparent electrode, disposed on a side of the second substrate opposite to the first substrate, and in a pixel region, each transparent electrode being respectively disposed in the transmissive region, extended to the reflective region and electrically connected to the first switching element;
    a plurality of color filter layers, disposed on a side of the second substrate opposite to the first substrate, each color filter layer being respectively disposed in each pixel region; and
    a liquid crystal layer, disposed between the first substrate and the second substrate.

2. The transflective display panel of claim 1, further comprising a plurality of bumps, disposed on the first substrate, each bump being respectively disposed in each reflective region, and located between each reflector and the first substrate.

3. The transflective display panel of claim 2, wherein each bump has a rough surface, so that each reflector also has a rough surface.

4. The transflective display panel of claim 1, further comprising a plurality of protrusions, respectively disposed in each reflective region, each protrusion being disposed between each transparent electrode and the liquid crystal layer.

5. The transflective display panel of claim 1, wherein each EL element comprises an anode, a light-emitting layer and a cathode, respectively sequentially disposed on the first substrate in each transmissive region, and each anode is respectively electrically connected to each driving element.

6. The transflective display panel of claim 5, wherein in each pixel region, the cathode is extended to the reflective region.

7. The transflective display panel of claim 5, wherein in each pixel region, the cathode covers the reflector.

8. The transflective display panel of claim 5, wherein in each pixel region, the cathode is electrically connected to the reflector.

9. The transflective display panel of claim 5, wherein the light-emitting layer of each EL element comprises an organic light-emitting material.

10. The transflective display panel of claim 1, further comprising a quarter-wave plate, disposed on the other side of the second substrate opposite to the first substrate.

11. The transflective display panel of claim 10, further comprising a polarizer, disposed on the quarter-wave plate.

12. The transflective display panel of claim 1, further comprising two alignment layers, respectively disposed between the liquid crystal layer and the first substrate and disposed between the liquid crystal layer and the second substrate.

13. The transflective display panel of claim 1, wherein in each pixel region, the color filter layer is disposed in the reflective region.

14. The transflective display panel of claim 13, wherein each of the EL elements comprises red light-emitting elements, green light-emitting elements, blue light-emitting elements or combinations thereof.

15. The transflective display panel of claim 1, wherein in each pixel region, the color filter layer is disposed in the reflective region and the transmissive region.

16. The transflective display panel of claim 15, wherein the EL elements are white light-emitting elements.

17. The transflective display panel of claim 1, further comprising a plurality of second switching elements, respectively disposed on the first substrate in each pixel region, and in each pixel region, the second switching element is electrically connected to the driving element.

* * * * *